H. Vansand's.
Shutter Fastener.
Nº 17,243. Patented May 5, 1857.

UNITED STATES PATENT OFFICE.

HORACE VANSANDS, OF MIDDLETOWN, CONNECTICUT.

BLIND-FASTENING.

Specification forming part of Letters Patent No. 17,243, dated May 5, 1857; Reissued April 20, 1869, No. 3,392.

*To all whom it may concern:*

Be it known that I, HORACE VANSANDS, of Middletown, in the county of Middlesex and State of Connecticut, have invented a new and useful Improvements in the Mode of Making and Applying Fastenings for Window-Blinds and Shutters; and I do hereby declare that the following is a full, clear, and exact description of the construction and operation of the same, reference being had to the annexed drawings, making a part of this specification, in which—

Figure 1:
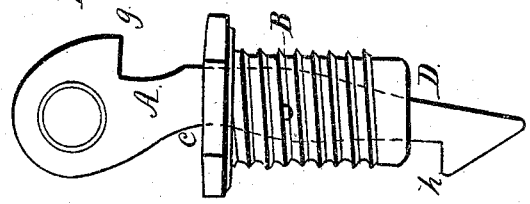
Figure 5:
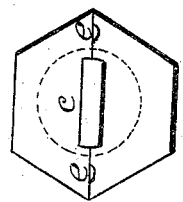
Figure 3:
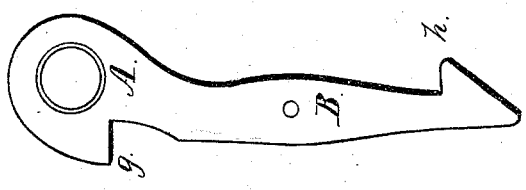
Figure 2:
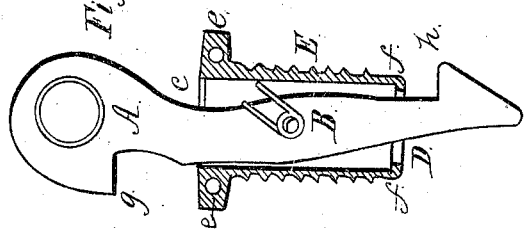
Figure 4:
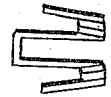

Figure 1 represents the fastening complete and ready for application. Fig. 2 represents one half of the shell or case with the hook and the spring, and its screw threads. Fig. 3 represents the hook. Fig. 4 represents the spring. Fig. 5 represents the larger end of the case or shell.

A is the hook.

B is the rivet or small screw, with the spring coiled around the same, whereby the two parts of the shell or case are united to form the shell or case into a screw.

C is the slot in the larger end of the shell or case.

D is the slot in the smaller end of the shell or case.

The different parts of the fastening are made of iron or any other suitable metal. The shell or case is cast in two parts with its screw threads on the convex side; the upper side of each part being concave; so that when the parts are united, with the hook inserted, as shown in Fig. 1, the hook will play back and forth in the slots C and D, the respective lengths of which will vary according to the size of the hook and shell, and the length of play required. The spring Fig. 4, serves to direct the motion of the hook and to retain it in place.

The points $e$, $e$, and $f$, $f$, in the half of the shell (Fig. 2.) are let into corresponding holes in the other part of the shell, so as to keep the parts firm when united by means of the rivet or small screw B. The fastening thus completed, (as shown in Fig. 1,) is applied to the blind or shutter by boring a hole therein and forcing the fastening into the hole by means of a wrench so that the screw part of the shell shall be within and the respective ends of the shell without the shutter or blind. The fastening being thus fixed horizontally to the shutter or blind, keeps the same in place when shut by the part of the hook $g$ passing around a staple in the sill of the window, and also keeps the shutter or blind in place when open by the part of the hook $h$ passing around and holding to a suitable catch inserted in the building.

What I claim as my invention and desire to secure by Letters Patent is—

The attaching of the blind hook by means of a screw or rivet between and in the recess of the two shells or case as set forth.

Dated at Middletown the 14th day of March A. D. 1857.

HORACE VANSANDS.

In presence of—
MARIA W. BARNES,
JONATHAN BARNES.